United States Patent
Peon et al.

(10) Patent No.: US 7,835,731 B2
(45) Date of Patent: *Nov. 16, 2010

(54) TELEPHONE WITH DYNAMICALLY PROGRAMMABLE PUSH BUTTONS FOR ACCESS TO ADVANCED APPLICATIONS

(75) Inventors: Roberto Peon, Atlanta, GA (US); Douglas R. O'Neil, Marietta, GA (US)

(73) Assignee: AT & T Intellectual Property II, L.P., Reno, NV (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/329,522

(22) Filed: Dec. 5, 2008

(65) Prior Publication Data

US 2009/0143058 A1    Jun. 4, 2009

Related U.S. Application Data

(63) Continuation of application No. 11/588,897, filed on Oct. 27, 2006, now Pat. No. 7,463,885, which is a continuation of application No. 11/245,706, filed on Oct. 7, 2005, now Pat. No. 7,133,665, which is a continuation of application No. 10/109,442, filed on Mar. 28, 2002, now Pat. No. 6,978,129.

(51) Int. Cl.
*H04M 3/00* (2006.01)

(52) U.S. Cl. ............. 455/419; 455/418; 455/410; 455/411; 379/355.06; 379/355.09; 379/355.03; 379/216.01

(58) Field of Classification Search ............. 455/410, 455/411, 418, 419; 379/355.06, 355.09, 379/355.03, 216.01
See application file for complete search history.

(56) References Cited

U.S. PATENT DOCUMENTS

| | | | |
|---|---|---|---|
| 5,963,864 | A | 10/1999 | O'Neil et al. |
| 6,255,966 | B1 | 7/2001 | Siegmund et al. |
| 6,330,079 | B1 | 12/2001 | Dugan et al. |
| 6,351,634 | B1 | 2/2002 | Shin |
| 6,363,264 | B1 | 3/2002 | Overy et al. |
| 6,647,260 | B2 | 11/2003 | Dusse et al. |
| 2002/0068599 | A1* | 6/2002 | Rodriguez et al. ......... 455/550 |
| 2002/0190956 | A1* | 12/2002 | Klein et al. ............... 345/169 |
| 2003/0133549 | A1* | 7/2003 | Virag et al. .............. 379/93.25 |

* cited by examiner

*Primary Examiner*—Wayne Cai
(74) *Attorney, Agent, or Firm*—Akerman Senterfitt; Michael K. Dixon; Peter A. Chiabotti

(57) ABSTRACT

A device and method for providing simple access to subscriber selected applications that reside in a telephone network. A programmable communication device that includes programmable push buttons operable for providing a user one button access to voice based and text based applications. A storage register is associated with each of the programmable push button and is operable for storing a directory number, such as a telephone number and a server address. The communication device includes a unique programming permission code for security purposes, such as restricting the use/reprogramming of the push buttons. A method of programming device push buttons including entering the programming permission code and selected advanced application information into the device. The method of programming may be done remotely or manually using various provisioning techniques.

19 Claims, 5 Drawing Sheets

TELEPHONE WITH DYNAMICALLY PROGRAMMABLE PUSH BUTTONS FOR ACCESS TO ADVANCED APPLICATIONS

CROSS-REFERENCE TO RELATED APPLICATIONS

This patent application is a continuation of U.S. patent application Ser. No. 11/588,897, entitled "Telephone with Dynamically Programmable Push Buttons for Access to Advanced Applications," filed Oct. 27, 2006 (now U.S. Pat. No. 7,463,885, issued Dec. 9, 2008), which is a continuation of U.S. patent application Ser. No. 11/245,706, entitled "Telephone with Dynamically Programmable Push Buttons for Access to Advanced Applications," filed on Oct. 7, 2005 now U.S. Pat. No. 7,133,665, issued Nov. 7, 2006), which is a continuation of U.S. patent application Ser. No. 10/109,442, entitled "Telephone With Dynamically Programmable Push Buttons for Access to Advanced Applications," filed on Mar. 28, 2002 (now U.S. Pat. No. 6,978,129, issued Dec. 20, 2005), and assigned to the same assignee as these applications. The aforementioned patent applications are expressly incorporated herein, in their entirety, by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The present invention relates generally to the field of telecommunications. More specifically, the present invention relates to a telephone with dynamically programmable push buttons that provide simple access to advanced applications that reside in a telephone network.

BACKGROUND

Telephone network carriers, and in particular wireless carriers, derive revenue from air time usage and related services. Competition among telephone carriers for subscribers has lead to many carriers providing more air time minutes for the same dollar amount. To increase customer satisfaction and loyalty, interest in service, and revenue levels, what is needed are novel services and methods of providing those services to subscribers in a desirable and easy to use manner.

Wireless telecommunication markets may be divided into two segments, a high end segment in which subscribers use their telephones on a regular basis and also subscribe to various voice services, and a low end segment in which subscribers do not use their telephones on a regular basis, such as with a prepaid service plan or a low minute plan in which the telephone is used for emergency purposes only. What is desired by a carrier is to increase air time and voice service usage of both the high and low end subscriber segments for the purpose of increasing revenue. By providing access to thousands of voice based applications, subscribers may use their telephones for purposes other than calling someone. With respect to the low end segment, voice based applications may be more important to subscribers than text and graphic based applications due to the fact that wireless devices that support text and graphics are generally more expensive and are not an option for low end subscribers.

Conventional wireless telephones may now be used to gain access the Internet, which may be used for communication via text messages and for accessing information. For example, email may be accessed by dialing a phone number to a voice portal, such as a machine that communicates with a mark up language, such as XML.

Voice portals may be expensive to develop and operate. For example, voicemail is one of the most common services offered by a carrier. If a carrier were to develop a business relationship with a third party that created a voice based application, such as voicemail, the carrier would only be responsible for providing access to the application, and not the application itself. Using this strategy, the carrier does not have to invest time and money into research, development, and application maintenance. The business relationship benefits the carrier by stimulating air time usage while providing application control for the carrier.

In conventional telecommunications systems, a number of different telecommunications services, or applications, are offered to subscribers. Each telecommunications service requires a unique telephone number. Examples of telecommunications services that require a unique telephone number are automatic routing services, voicemail services, paging services, cellular phone services, and conference call services. One of the drawbacks of each service requiring a different telephone number is that managing multiple telephone numbers for a subscriber that uses multiple communications services can prove to be quite cumbersome. For example, a subscriber may have to provide a first telephone number for conference call services, a second telephone number for voicemail services, and a third telephone number for cellular services. Thus, a subscriber must remember all of the unique telephone numbers and what services are associated with each telephone number. Oftentimes, a party confuses the mapping of telephone numbers to services and reaches the wrong service when dialing the telephone number. For instance, a caller may dial a number thinking that he will reach a person, and instead the caller reaches his financial institution.

Another drawback of conventional systems is the lack of choices regarding the telecommunications services that are provided to subscribers. A subscriber may want a choice in application providers so as to get the best possible service to fit his/her needs. For example, a subscriber may require a voicemail service with many different features and options, while a second subscriber of the same carrier may require only a basic voicemail service. Still further, a subscriber may wish to provide other people with access to his voicemail, which may require an even more complicated voicemail system.

Unfortunately, with conventional systems such configurability of telecommunications services is not available. Moreover, a subscriber has difficulty managing a multitude of communications services, where each service has a different number. For example, if the subscriber wishes to update multiple aspects of his or her services over a phone, multiple iterative menu selections and presentations are required. Furthermore, a caller must typically call one number to update aspects of one service, and then call another number to update aspects of another service.

Accordingly, there is a need for a device, such as a wireless telephone, which provides for easy access to a variety of advanced features which reside in a telephone network. The device must be easy to use by a subscriber, provide flexibility for the carrier in providing a wide range of advanced services to the subscriber, provide control for the carrier, provide the carrier flexibility in routing a call to a third party, and provide security for the carrier to ensure that competitors will not be able to use the subscriber's telephone for the advanced features. What is desired is a device and provisioning methods that allow a subscriber access to third party voice based applications, while at the same time providing increased revenue for a network carrier.

SUMMARY

In the preferred embodiment, the present invention provides a voice based device having simple, dynamically programmable push buttons. By providing a simple method for a subscriber to access pre-selected voice based applications, more air time may be generated by a subscriber which results in increased revenues for a network carrier. Each subscriber has the ability to select the applications that they want associated with the programmable buttons. Voice based applications may include applications offered by the network carrier, and applications offered by a third party. The device and systems of the present invention provide control for the network carrier while allowing a subscriber to access a host of voice based applications developed by the carrier, or by a third party. The systems of the present invention further allow a carrier to reduce the amount of capital invested into creating and developing applications on their own.

An embodiment of the present invention provides a programmable communication device comprising communication hardware for sending and receiving telephonic signals, at least one programmable push button, a storage register associated with each of the programmable push buttons, and a unique programming permission code stored within the programmable communication device. A push button is operable for providing a user simple access to an advanced application in a telephone network. The storage register contains a directory number or a server address associated with an advanced application. The programming permission code is for security purposes and restricts a third party from use/reprogramming the programmable push buttons.

In a preferred embodiment, a subscriber may choose each advanced application from a plurality of advanced applications provided by a network carrier. The subscriber then contacts the network carrier and assigns each chosen advanced application to a preselected programmable push button. The advanced application may include a voice based application, a text based application, a third party application, an information service application, and a conference bridge application. The advanced applications may reside anywhere in the telephone network.

The programmable push buttons of the communication device may be programmed remotely or manually. The communication device of the present invention may include a wireless telephone, a wireline telephone, a personal digital assistant, and a pager.

A further embodiment of the present invention provides a method of programming a communication device, wherein the communication device provides access to advanced applications in a telephone network. The method includes entering a unique programming permission code and identification information related to the communication device into a system database, providing the communication device to a subscriber, providing the subscriber with a plurality of advanced applications comprising destination codes, contacting the communication device, sending a programming message, the destination codes, and programming permission code to the communication device, verifying the programming permission code, and programming the dynamically programmable push button.

The present invention provides a secure and easy to use method for personalizing subscriber applications. The amount of voice based applications that a subscriber may choose from is increased due to a network carrier providing access to third party applications. Due to the present invention, third parties are more likely to enter into a business relationship with a network carrier that provides easy access to that third parties' applications. Subscribers benefit by being able to receive a wider variety of applications. A network carrier benefits due to increased air time usage as a result of subscribers accessing the voice based applications, and also due to revenues from third parties as a result of providing subscriber access to third party applications.

Additional objects, advantages, and novel features of the invention will be set forth in part in the description which follows, and in part will become more apparent to those skilled in the art upon examination of the following, or may be learned by practice of the invention.

DETAILED DESCRIPTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

Figure 1:
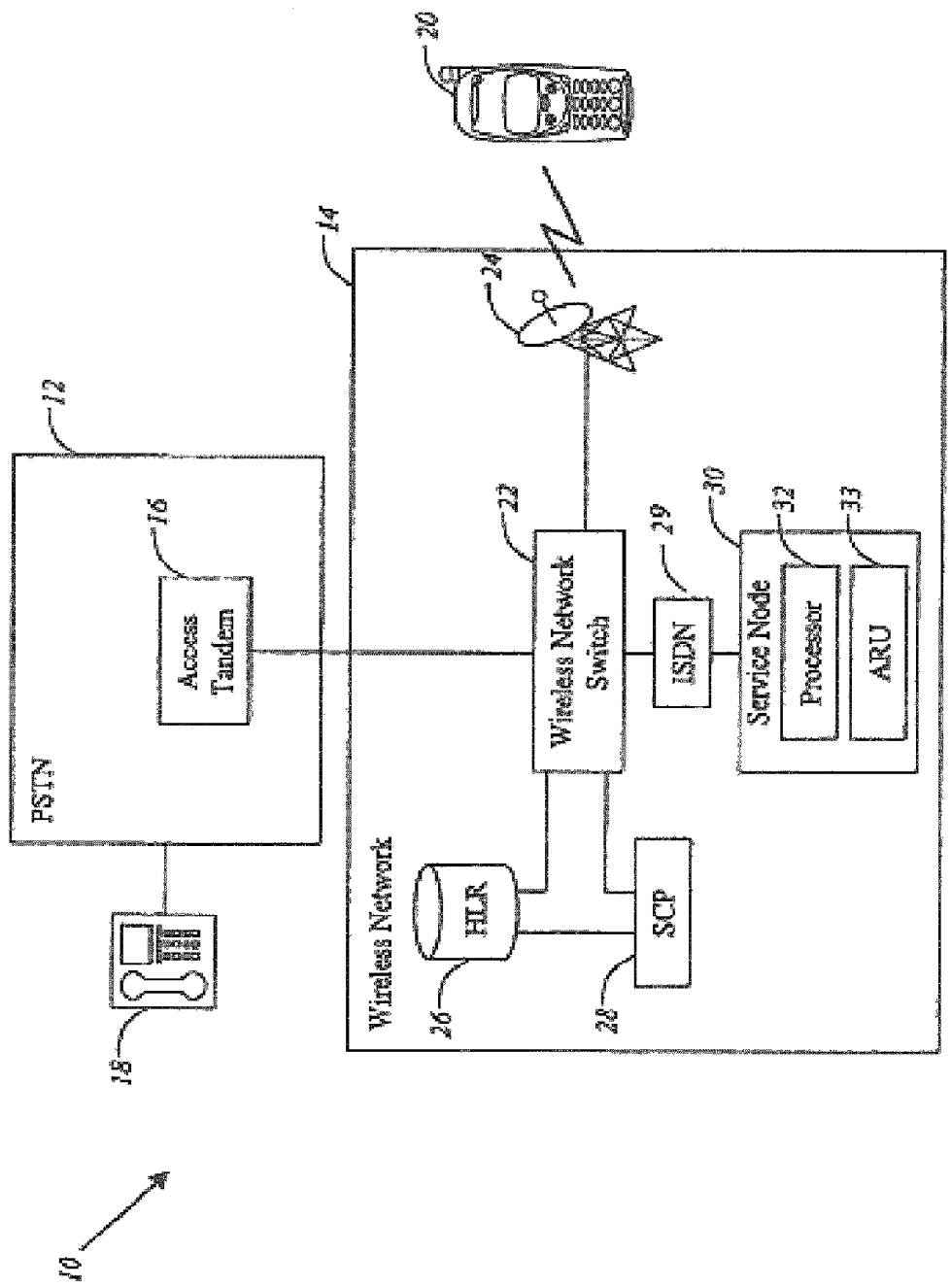
FIG. 1 is a functional block diagram illustrating a hardware environment for placing a call to an advanced voice based application using a telephone comprising a programmable push button in accordance with an exemplary embodiment of the present invention.

Referring now to the drawings, in which like numerals indicate like elements throughout the several figures, FIG. 1 illustrates a conventional communication system hardware environment for cellular and Personal Communication Systems (PCSs) which use interconnected communications networks to allow network users to communicate with one another. The preferred environment is a telecommunications system 10 that includes a public switched telephone network (PSTN) 12 and a wireless network 14. The PSTN 12 contains Advanced Intelligence Network (AN) elements of a typical local exchange carrier. The PSTN 12 may be viewed as the aggregate of all lines and equipment serving to connect telephone users, but excludes private networks formed from leased telephone lines, wireless systems, and public data networks like the Internet.

The terminating equipment in a wireless network 14 is "wireless" in the sense that the equipment is not connected by any lines or wires to network elements. The terminating equipment in a wireless network 14 (referred to herein as "wireless units") receive communications through radio signals rather than through wire or fiber optics. A cellular telephone network is an example of a wireless network 14. Thus, a "wireless unit" is generalized to include a cellular telephone, a mobile telephone, a mobile station, a portable telephone, and other devices that receive communications through radio signals rather than through wire or fiber optics. The present invention may also be used in connection with any additional wireless system well known to those skilled in the art.

As illustrated in FIG. 1, the PSTN 12 is connected to the wireless network 14 through an access tandem 16. The connection of the PSTN 12 to the wireless network 14 through the access tandem 16 (or similar network element) allows for the interconnection of these two communication systems. Such interconnection is necessary so that a call from a wireline unit, such as a landline telephone 18, may be connected to a wireless communications device, such as a wireless telephone 20 or a personal digital assistant (PDA).

Also, a wireless network 14 typically includes a geographic radio service area divided into cells. Each cell is typically serviced by a broadcast antenna 24 that permits communication between a wireless unit 20 operating within the area of the cell, and a cell control (also known as a base station). The cell control, in turn, is connected to a wireless network switch 22 (also referred to as a Mobile Switching Center (MSC)). The wireless network switch 22 communicates with the cell control either through dedicated telephone facilities, or more frequently, through a cell-to-mobile switching center data link disposed between the cell control and the wireless network switch 22.

Generally, a wireless network switch 22 keeps up with the location of wireless units 20 that are deemed to be associated with that particular switch 22, such that the switch 22 is able to provide information with respect to the location and/or availability of any particular wireless unit 20. More specifically stated, the active status and/or availability of a wireless unit 20 in a particular area is typically made known to the relevant wireless network switch 22 as a result of a communication process between the wireless unit 20 and the cell control. The process is commonly known in the art as registration. Once a wireless unit 20 registers within a geographic area served by a wireless network switch 22, the switch 22 receives the registration information from the cell control and stores the pertinent information in a register, such as a Home Location Register (HLR) 26. If a wireless unit 20 is associated with a subscriber of that particular wireless network 14, then the registration information is stored in the HLR. In other words, the wireless unit 20 is considered to be operating within its home territory. On the other hand, if the wireless unit 20 is not associated with a subscriber of that particular wireless network, then the registration information may be stored in a Visitors' Location Register (VLR). In other words, the subscriber unit 20 is considered to be a visitor to the geographic area serviced by the wireless network switch 22. If necessary, the pertinent information relating to a particular wireless unit 20 is passed through the wireless network 14 to the wireless network switch 22 that is deemed to be the "home" switch of a particular unit 20. These registers, the Home Location Register (HLR) 26 and the Visitors' Location Register (VLR), are used by the wireless network 14, in any of several different manners well known to those skilled in the art, to work with the PSTN 12 in the routing of communications to and from subscriber units 20 and through the PSTN 12.

Also illustrated in FIG. 1, an AIN typically includes a telecommunications element referred to as a Service Node (SN) 30. The service node 30 may be physically implemented by the same types of computers that embody the SCP 28. In addition to computing capability and database maintenance features, a service node 30 may also include switching fabric, voice and Dual Tone Multiple Frequency (DTMF) signal recognition devices, and voice synthesis devices.

A service node 30 is used in the present invention for enhanced features and services that require user interaction, such as in voice based advanced applications and feature provisioning. For example, the service node 30 may be used in routing and setting up communications such as conference calls, voice calls to information services, calls to access an information service defined by a retailer, and any other voice based application present in a telephone network.

A service node 30 is typically connected to one or more switches via an Integrated Services Digital Network (ISDN) link 29. An ISDN link 29 provides Primary Rate Interface (PRI) and Basic Rate Interface (BRI) interfaces for voice and data channels between the service node 30 and the PSTN 12. A service node 30 may also comprise a conference bridge and a service node control computer. The conference bridge may comprise a switch for "bridging" or connecting conference participants. The service node control computer is a computer which executes software for connecting a dynamically programmable push button telephone user to their desired advanced application. Additionally, the service node control computer may be accessed for provisioning and maintenance purposes via the Internet and a firewall.

To summarize, FIG. 1 illustrates the basic elements of a wireless network 14 necessary for an understanding of the operation of embodiments of the present invention described herein. As illustrated in FIG. 1, the wireless network 14 is connected to the PSTN 12 by a connection between an access tandem 16 and a wireless network switch 22. The switch 22, in turn, is connected to an antenna 24 which transmits and receives information (and hence, communications) from the wireless network switch 22 and a wireless unit 20. The wireless network switch 22 includes a register, which is illustrated as a HLR 26, but may also/alternatively include a VLR. Optionally, the register(s) may be located in additional wireless network elements, such as a Mobile Switching Center (MSC). The home location register 26 is connected by a data link that uses wireless network protocols well known to those skilled in the art, to a Service Control Point (SCP) 28 in the PSTN 12. Through the data link, the SCP 28 checks with the wireless network 14 with respect to the activity and/or availability of a particular wireless unit 20 operating within the area served by the wireless network 14.

For the sake of simplicity, the foregoing descriptions of the PSTN 12 and wireless network 14 were limited to only a few examples of particular network elements and their respective interconnections. From this basic explanation of the network elements and their respective interconnections, those skilled in the art will understand the operation of the present invention in the context of the increased complexity present in today's telecommunications systems.

Pursuant to one embodiment, each piece of terminating equipment in an advanced intelligent network is assigned a directory number. In the description of the present invention, the term "directory number" is used in its generally understood meaning to be the number which is dialed or input by a subscriber or source and used by the network carrier to route the communication so as to reach terminating equipment associated with the dialed directory number. A directory number may be commonly referred to as a telephone number, and in an Information Technology (IT) based system, a server address.

Each application within the telephone network operates on an application platform. The network carrier has complete control over access to these applications. For example, the carrier may specify what services are available to a subscriber based upon the subscriber's account. Each application platform has a unique network identification code, which may be a directory number. For example, call conferencing is an application that runs on an application platform. A customer desiring to access a call conferencing application may simply actuate a dynamically programmable push button (PPB) for call conferencing that has been programmed with a directory number. Each PPB includes a storage register that contains the directory number of the advanced application that it provides direct access to. When a PPB is actuated, the directory number digits stored in the PPB register are pulsed out and the call is routed to the call conferencing application for further processing.

Referring to FIG. 1, the application platform includes the service node 30 that is associated with the network switch 22. The service node 30 includes a processor 32 that provides intelligent application processing for the switch 22. Certain functionality that may be performed by the switch 22 is off-loaded to the service node 30 to enable the switch 22 to focus on performing switching and queuing functionality. The service node 30 is linked to the switch 22 via an Integrated Services Digital Network (ISDN) link 29, as described above.

The service node 30 includes an Automated Response Unit (ARU) 33 that provides voice response and menu routing functions to a subscriber. The ARU 33 facilitates caller input via selection of dual tone multi-frequency (DTMF) digits, such as by pressing keys on a telephone keypad. The ARU 33 provides various automated menus which the caller may navigate through in order to program a desired service. The ARU 33 includes a network audio server which is a server computer that has a voice telephony interface to the service node 30. The audio server is linked to the service node 30 via multiple voice trunks and, in general, provides an audio interface to a subscriber. The ARU 33 also includes an automated call processor that provides intelligent call processing functions for the ARU 33. The ARU 33 is responsible for handling all initial inbound calls for the platform. The automated call processor operates by executing scripts that take subscribers through a series of menus, accept caller input, make decisions based upon caller input, and perform actions such as the transfer of a call to another destination to provide appropriate provisioning services. The automated call processor prompts the audio processor to play prompts to subscribers, to gather DTMF digit input, to play various recorded messages, and to direct the subscriber to other destinations if necessary.

The applications selected by a subscriber are input into a subscriber profile. The subscriber profile is stored for use by the platform. The subscriber profile specifies which applications are chosen by a subscriber and the directory numbers associated with each application. The subscriber profile also identifies the telephone unit and Programming Permission Code (PPC), which is discussed in detail below.

Figure 2:
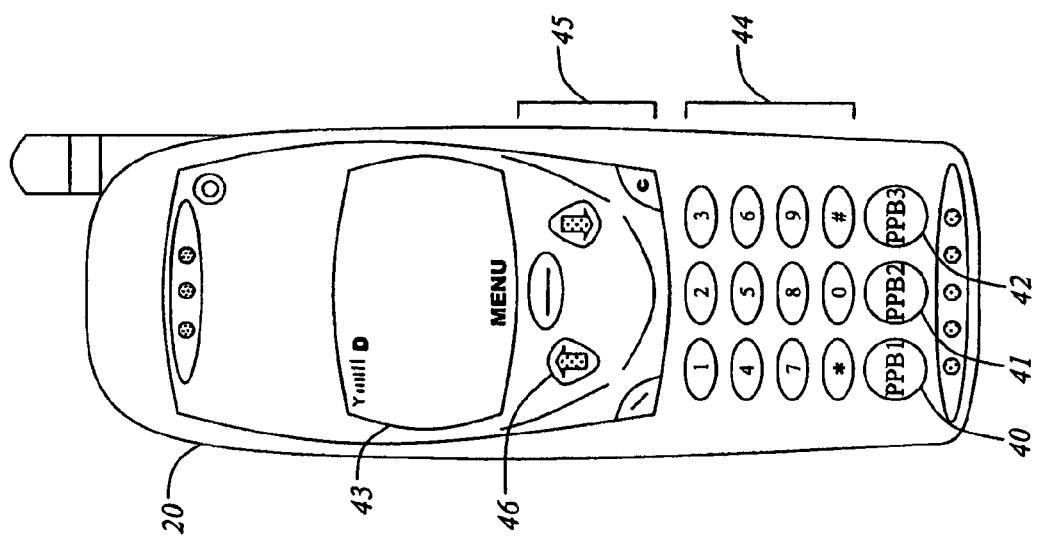
FIG. 2 is an illustration of a wireless unit comprising programmable push buttons in accordance with an exemplary embodiment of the present invention.

Referring to FIG. 2, the wireless unit (20, FIG. 1) of the present invention may comprise a wireless telephone having one or more dynamically programmable push buttons (PPB), in one example three push buttons are used. However, it is to be understood that any number of buttons may be used. A key or a switch may also be used in place of the push button. A wireless unit 20 is used for exemplary purposes only, and the present invention is not limited to wireless communication devices. A landline device, such as a landline telephone, may also be used. The communication unit of the present invention further comprises hardware operable for sending and receiving telephonic signals, the hardware being well known to those of skill in the art.

A dynamically programmable push button (PPB) allows a subscriber to depress one button, PPB1 40 for example, to access an advanced feature within the telephone network, such as a voice call into a conference bridge. PPB2 41 may be used, for example, to access a voice call to an information service. PPB3 42 may be used, for example, to access an information service defined by a retailer. The PPBs comprise a storage register operable for storing a directory number. Methods for provisioning the PPBs are discussed below.

In addition to the dynamically programmable push buttons, in one embodiment, the wireless unit 20 may comprise features common to conventional wireless telephones, such as an LCD display 43, a set of dialpad keys 44, feature keys 45, and arrow keys 46 operable for scrolling through features displayed on the LCD display 43.

In a first embodiment, the push buttons of the dynamically programmable device of the present invention may be provisioned remotely for each device. Remote provisioning allows a subscriber out in the remote parts of a carrier's network to dial into customer service and request access to a desired application. Advanced application data is provisioned or input by a subscriber into a database using various techniques. These techniques may include a menu-based dual tone multiple frequency (DTMF) entry system in which a subscriber dials into a provisioning system which guides the subscriber through a menu of provisioning options. The subscriber uses the subscriber's touch-tone phone to respond to the menu. Provisioning software captures the subscriber's responses and formulates these responses into a programmed push button record, which may then be stored in a database. Additionally, the service node (30, FIG. 1) may provide a variety of voice, Automated Speech Recognition (ASR), FAX, Text to Speech-based provisioning services using off-the-shelf voice circuit boards from vendors such as Dialogic™ and Antares Audio Technologies™. Such provisioning techniques may be implemented via hardware within the service node 30 and/or via software executing on a service node control computer in various embodiments.

In a second embodiment, the push buttons may be provisioned for each subscriber using a short messaging service (SMS) reader in the phone. The SMS reader is a bearer channel operable for opening a text message and assigning a push button based upon the receipt and interpretation of a code. The text message sent to the network carrier may indicate which advanced application in the telephone network the subscriber desires to have access to, and which programmable push button 40, 41, 42 will be assigned to that particular advanced application. In an alternative embodiment, the push buttons may be provisioned by a subscriber using browser capability and either SMS as a bearer circuit, switched data as a bearer, or packet data as a bearer.

In a third embodiment, the push buttons of the dynamically programmable telephone of the present invention may be provisioned in the telephone network at the service node (30, FIG. 1) or in the register, such as the HLR (26, FIG. 1). The push buttons are provisioned by an Intelligent Network (IN) service for each subscriber. In an alternative embodiment, the push buttons may be provisioned by device type at the service node 30 through the wireless network switch (22, FIG. 1).

In a fourth embodiment, the push buttons of the dynamically programmable telephone of the present invention may be provisioned by the network carrier operator, the subscriber, or an independent third party. Subscriber and independent third party provisioning may take place at a web interface in which a subscriber account profile may be displayed. Using identification information associated with each subscriber, advanced applications may be selected and assigned to specific push buttons through network carrier provisioning.

Each individual dynamically programmable push button telephone of the present invention has a unique Programming Permission Code (PPC) associated with the telephone and stored within in a secure manner. The PPC allows the network carrier to prevent a competitor from gaining access to a telephone and using/reprogramming the programmable push buttons of the telephone. Without knowledge of the PPC, a former subscriber of one network carrier that subscribes with a different network carrier cannot use the programmable push buttons. The PPC must be entered into the telephone prior to programming the push buttons. The PPC is entered into a telephone during the manufacturing process and cannot be changed during the lifespan of the telephone. Generally, a telephone's PPC is only known to the manufacturer of the telephone and the carrier who sells the telephone to an end user.

Figure 3:
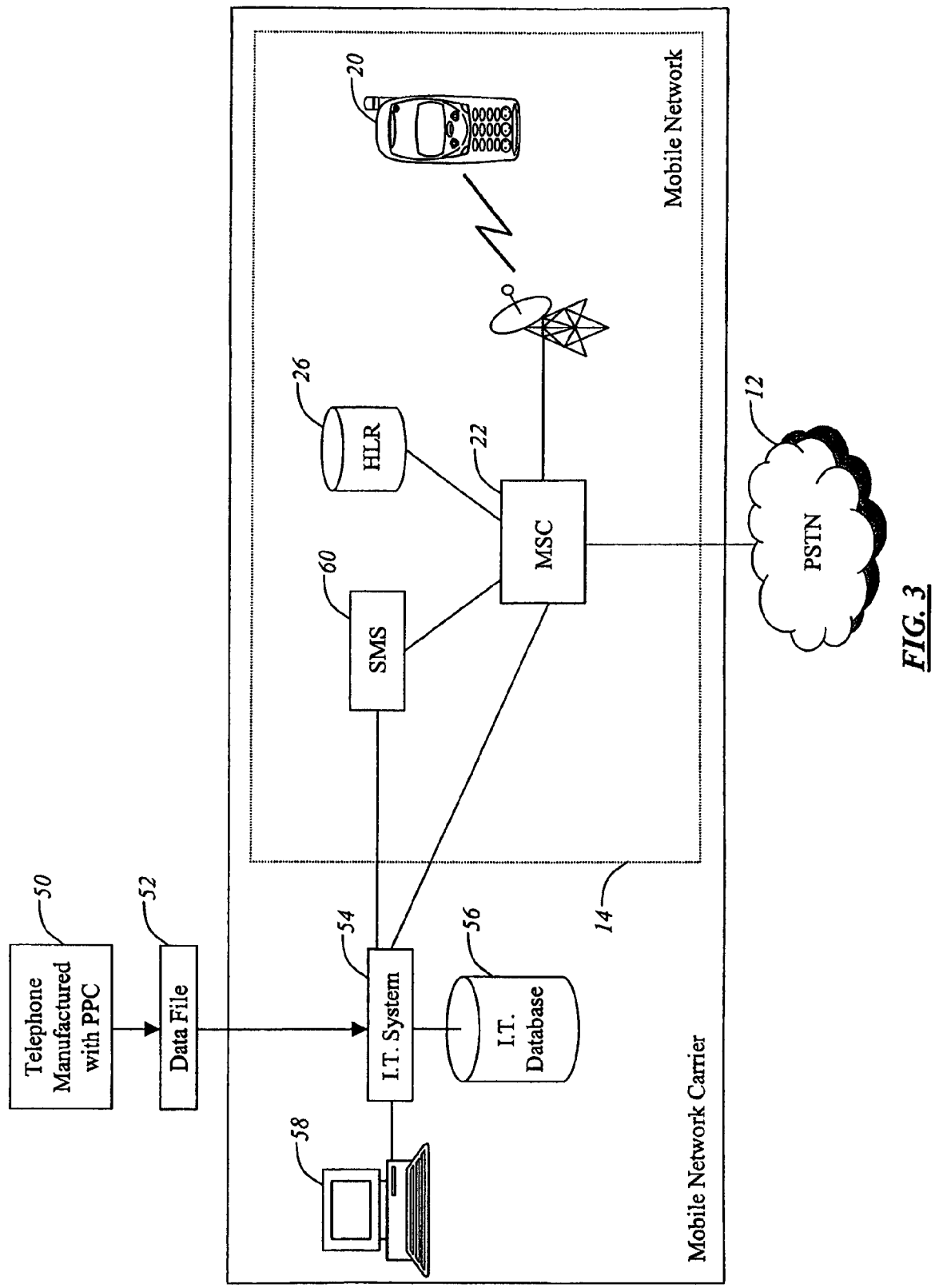
FIG. 3 is a functional block diagram illustrating a hardware environment for programming the push buttons of the wireless unit of FIG. 2 in accordance with an exemplary embodiment of the present invention.

Referring to FIG. 3, a first exemplary embodiment of push button programming of the present invention includes a wireless telephone having a unique PPC 50. An associated data file 52 accompanies the telephone 20 to the mobile network carrier. A telephone identification number may be used to identify each device. The data file 52 information from the manufacturer is stored in a network carriers Information Technology (IT) system 54 and IT system database 56. The IT system database 56 contains a record that associates chosen subscriber applications with application network destination codes. All queries into the network database 56 may be done by the carrier through an interface, such as a computer 58. The IT system 54 is further responsible for querying the IT database 56 and determining the PPC for each telephone 20.

Subscriber and carrier requests and responses may be sent/received via a short messaging service (SMS) 60 via a wireless network switch (also referred to as a Mobile Switching Center (MSC) 22. Subscriber and carrier requests and responses may also be sent/received using a data telephone call and the MSC 22, wireless network 14, and PSTN network 12. As stated above, the MSC 22 may include a register, which is illustrated as a HLR (26, FIG. 1), but may also/alternatively include a VLR. Optionally, the register(s) may be located in additional wireless network elements, such as the MSC 22.

Figure 4:
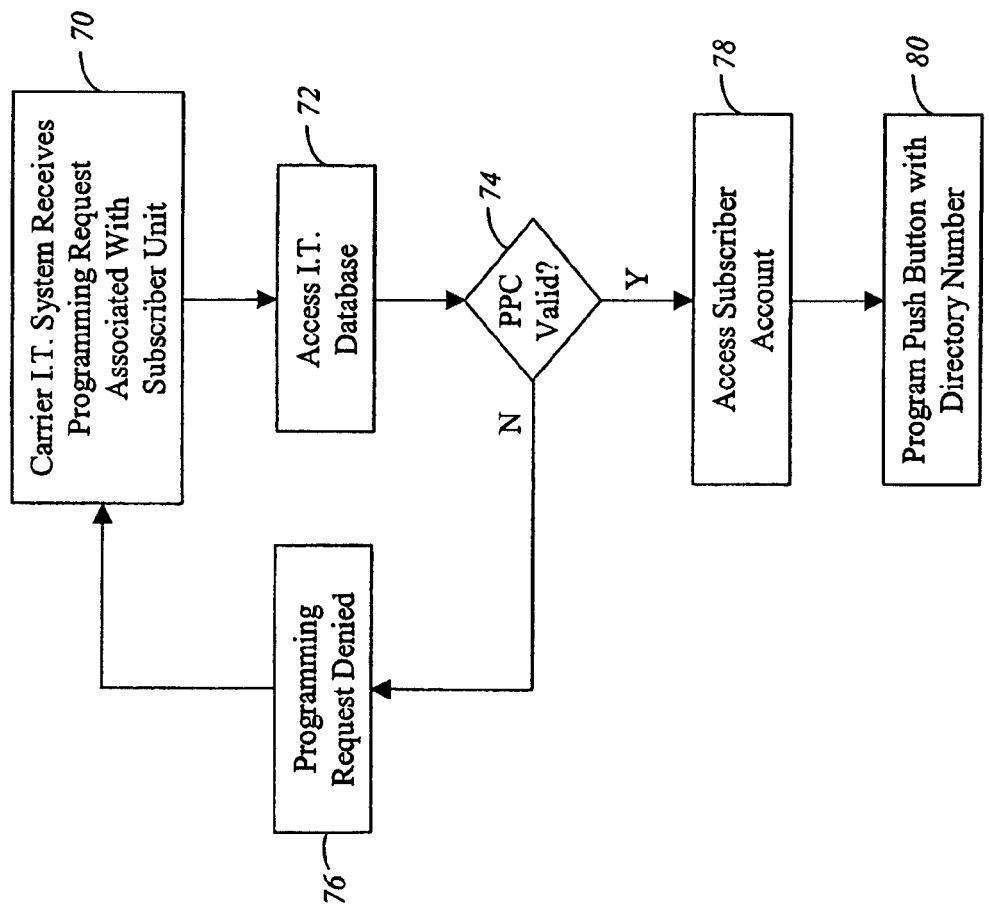
FIG. 4 is a flow chart illustrating the steps performed by a network carrier for programming a subscriber communication unit in accordance with an exemplary embodiment of the present invention.

Referring to the flowchart of FIG. 4, an exemplary request for programming to the I.T System (54, FIG. 3) is described. The flowchart chronologically presents the steps performed by the I.T. System 54. In step 70, the I.T. System 54 receives a call from a subscriber unit 20. The call is a request to program a push button by adding/removing an application from the subscriber's account.

In step 72, the I.T. System 54 accesses the database 56 which stores subscriber identification. In step 74, in order to ensure account security for the benefit of both the subscriber and the carrier, the I.T. System 54 checks the PPC for the subscriber's unit 20 using the identification information. In step 76, if it is determined that the PPC is invalid for the subscriber unit 20, the I.T. System 54 denies the request for programming a push button, and the I.T. System may try the PPC a second time to ensure that a mistake was not made. In step 78, if it is determined that the PPC is valid and recognized, the I.T. System 54 accesses the subscriber's account for the purpose of determining which applications a subscriber is allowed access to. For example, a low rate plan may allow a subscriber limited access to certain advanced applications, while a higher rate plan may allow for unlimited access to all applications in the telephone network provided by the carrier. In step 80, once the PPC has been verified and the subscriber account accessed, the network carrier then programs the push button selected by the subscriber with the directory number of the selected application.

Figure 5:
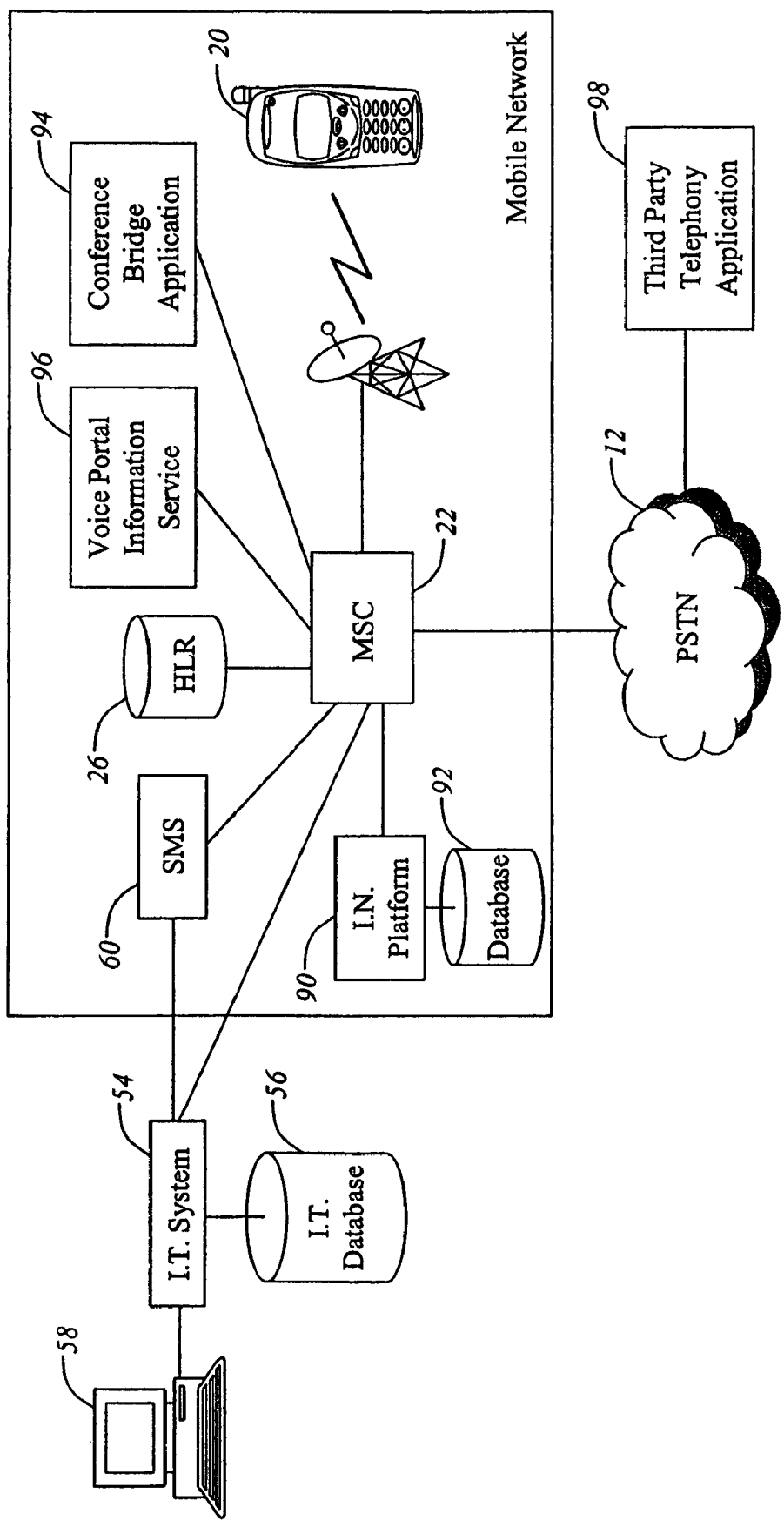
FIG. 5 is a functional block diagram illustrating a hardware environment for programming the push buttons of the wireless unit of FIG. 2, and further including advanced applications located within the telephone network in accordance with an exemplary embodiment of the present invention.

Referring to FIG. 5, an additional exemplary embodiment of push button programming of the present invention involves a network based solution for routing a call originating from a dedicated PPB. The home location register 26 has an originating trigger that allows a call to be routed to an Intelligent Network (IN) platform 90. The intelligent network platform 90 and associated IN database 92 comprise an application that recognizes the dialed directory digits of the call and relates those dialed digits to the network destination of an end user application, such as a conference bridge application 94, a voice portal information service 96, and a third party telephony application 98. The IN application instructs the mobile switching center 22 to route a call to the appropriate application. Each end user application is operated on an application platform that has a network destination code or a directory number.

The IT system 54 of the carrier populates the IN database 92 with a routing table unique to each subscriber. The routing table associates the network destination codes for the application platforms that are associated with the subscriber's service to each directory number in the storage registers associated with the PPBs of the subscriber's telephone unit 20.

The carrier may also provision the subscriber with the originating trigger in the HLR 26 so that originating calls for the customer go to the IN platform 90. When the subscriber initiates a call, the MSC 22 queries the HLR 26. The HLR 26 instructs the MSC 22 to route the call to the IN platform 90. The IN platform 90 comprises an application that reviews the dialed digits and the caller line identification (or other subscriber identifier). The IN platform 90 queries its database 92 and retrieves the table of network destination codes for the subscriber.

In one example, if the dialed digits are associated with PPB1 (40, FIG. 2), the IN platform 90 may instruct the MSC 22 to route the call to the destination code of the appropriate application platform, for example, a conference bridge application 94. The IN platform 90 may then release the call back to the MSC 22. The MSC 22 may then route the call to the network destination code that the MSC 22 received from the IN platform 90. In this example, the MSC 22 routes the call to the application platform that has the conference bridge application.

In a second example, if the dialed digits are associated with PPB2 (41, FIG. 2), the IN platform 90 may instruct the MSC 22 to route the call to the destination code of the appropriate application platform, for example, a voice portal information service 96. The IN platform 90 may then release the call back to the MSC 22. The MSC 22 may then route the call to the network destination code that the MSC 22 received from the IN platform 90. In this example, the MSC 22 routes the call to the application platform that has the voice portal information service application.

In a third example, if the dialed digits are associated with PPB3 (42, FIG. 2), the IN platform 90 may instruct the MSC 22 to route the call to the destination code of the appropriate application platform, for example, a third party telephone application 98. The IN platform 90 may then release the call back to the MSC 22. The MSC 22 may then route the call to the network destination code that the MSC 22 received from the IN platform 90. In this example, the MSC 22 routes the call to the application platform that has the third party application.

In a fourth example, if the dialed digits are associated with a directory number that is not stored in a PPB storage register, the IN platform 90 may instruct the MSC 22 to route the call to the original dialed digits. The IN platform 90 may then release the call back to the MSC 22. The MSC 22 may then route the call cased upon the original dialed digits.

The directory numbers stored in each PPB storage register may be changed manually by entering the PPC into a menu displayed on the subscriber's unit 20. When the subscriber depresses a PPB, the unit 20 calls the directory number stored in the PPB storage register and engages in a telephone call with the application.

Alternate provisioning techniques available to subscribers with Internet access include the use of a web-based form, a formatted file, and a formatted email message. When using a web-based form, a subscriber having a browser running on a computer with an Internet connection accesses a provisioning form by supplying a uniform Resource Locator (URL) for such a form. The subscriber may enter provisioning information (such as advanced application directory number or server address) into the form and send the form entries as a Common Gateway Interface (CGI) string, in one embodiment, to a provisioning software interface.

Other subscriber-provisioning mechanisms may include sending a formatted email or a formatted file from a subscriber computer to the service node 30. An exemplary formatted email message may have a subject line of "PUSH BUTTON PROGRAMMING, and contain labeled lines within the body of the email. Such labeled lines may take the form of: "PPB 1=3 155556768,', "PPB2=7 1655587 12", and "5185552437". When a service node 30 receives an email with a PUSH BUTTON PROGRAMMING subject line and containing the above three labeled lines, either a carrier operator or a provisioning module running on the service node 30 will extract the directory numbers and assigned push buttons. These extracted values may then be used to populate a push button programming information record, which is then stored in a data store and/or a database.

Provisioning techniques employing web-based forms, formatted files, and formatted email messages may be implemented on an application server. A programmable push button subscriber using the Internet may forward provisioning information to the application server through a firewall, in an embodiment.

The present invention may be better understood by way of an example in which a voicemail system is accessed by a subscriber. Assume that a subscriber has recently purchased a wireless unit 20 form a carrier that includes a PPC and a number of programmable push buttons. Most conventional wireless telephones include a voicemail key for directly accessing a voicemail service, usually a service provided by the carrier, and typically there is only one number for accessing that application. A network carrier does not have a way of remotely changing the voicemail button on a conventional wireless telephone. Using the device and systems of the present invention, a subscriber desiring to use a third party's voicemail service may have the voicemail address remotely programmed into the register of one of the programmable push buttons using any one of the provisioning techniques discussed above.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than by the preceding description, and all variations and equivalents which fall within the range of the claims are intended to be embraced therein.

What is claimed is:

1. A network element in a telecommunications network, comprising a controller to:
   receive subscriber unit identification information, wherein the subscriber unit identification information corresponds to a subscriber account and a programming permission code associated with the a subscriber unit having a dynamically programmable push button;
   receive a subscriber request for access to an application located within the telecommunications network;
   determine whether access to the application is granted based upon the subscriber account and the programming permission code; and
   program the dynamically programmable push button of the subscriber unit with a directory number if access is granted, wherein the directory number provides direct access to the application, wherein, once programmed, the dynamically programmable push button allows a subscriber to depress only one button to access the application, and
   wherein the programming permission code is entered into the subscriber unit prior to the subscriber unit being used by the subscriber, such that the programming permission code cannot be changed and is operative for restricting the use of the dynamically programmable push button.

2. The network element of claim 1, wherein the controller is adapted to program the dynamically programmable push button by at least one of:
   remote programming by a subscriber, programming in the network at a network switch,
   programming by an intelligent network, programming by a network operator,
   programming by a network carrier, and programming by a third party.

3. The network element of claim 1, wherein the application has a unique network identification code.

4. The network element of claim 3, wherein the unique network identification code comprises at least one of: a telephone number, a directory number, and a server address.

5. The network element of claim 1, wherein the programmable push button comprises a storage register operable for storing the unique network identification code.

6. The network element of claim 1, wherein the application comprises at least one of a voice based application, a text based application, a third party application, an information service application, and a conference bridge application.

7. In a communication device, a method comprising:
   programming a dynamically programmable key of the communication device with a menu-based entry provisioning system having provisioning options, wherein subscriber responses to the menu of provisioning options are formulated into a programmed push button record and stored in a database, and wherein the dynamically programmable key is operative for providing a subscriber access to a subscriber selected application residing outside the communication device in a telephone network;

entering into the communication device a programming permission code prior to programming the dynamically programmable key, wherein the programming permission code is entered into the communication device prior to the communication device being used by the subscriber, such that the programming permission code cannot be changed and is operative for restricting the use of the dynamically programmable key; and programming the dynamically programmable key with a directory number to provide access to the application, wherein, once programmed, the dynamically programmable key allows the subscriber to depress only one key to access the application.

8. The method of claim 7, comprising choosing the application from a plurality of applications provided by a network carrier.

9. The method of claim 8, wherein the plurality of applications may reside anywhere in the telephone network.

10. The method of claim 7, comprising assigning the application to a pre-selected programmable key.

11. The method of claim 7, wherein the application comprises at least one of: a voice based application, a text based application, a third party application, an information service application, and a conference bridge application.

12. The method of claim 7, wherein the menu-based entry provision system is responsive to dual tone multiple frequency (DTMF).

13. The method of claim 7, comprising programming the dynamically programmable key manually.

14. The method of claim 7, wherein the communication device comprises at least one of: a wireless telephone, a wireline telephone, a personal digital assistant, and a pager.

15. The method of claim 7, wherein the programming permission code is unique to the communication device.

16. The method of claim 7, wherein the dynamically programmable key cannot be changed during a lifespan of the communication device.

17. A non-transitory computer-readable storage medium in a communication device, comprising computer instructions to:

enable a programmable push button of the communication device to access an application with a directory number supplied by a system, wherein the system is adapted to:

receive identification information associated with the communication device, wherein the identification information corresponds to a subscriber account and a programming permission code associated with the communication device;

receive a request for access to the application located within a telecommunications network;

determine whether access to the application is granted based upon the subscriber account and the programming permission code; and supply the communication device the directory number if access is granted, wherein the directory number provides access to the application, wherein, once programmed, the programmable push button allows a subscriber to depress only one button to access the application, and wherein the programming permission code is entered into the communication device prior to the communication device being used by the subscriber, such that the programming permission code cannot be changed and is operative for restricting the use of the programmable push button.

18. The non-transitory computer-readable storage medium of claim 17, wherein the programmable push button is programmed by the system remotely.

19. The non-transitory computer-readable storage medium of claim 17, wherein the application comprises at least one of: a voice based application, a text based application, a third party application, an information service application, and a conference bridge application.

* * * * *